United States Patent
D'Agostini et al.

(10) Patent No.: US 6,582,218 B1
(45) Date of Patent: Jun. 24, 2003

(54) SELF-COOLING OXY-FUEL THROUGH-PORT BURNER FOR PROTRUDING INTO GLASS FURNACE ATMOSPHERE

(75) Inventors: Mark Daniel D'Agostini, Hazleton, PA (US); Aleksandar Georgi Slavejkov, Allentown, PA (US); Bryan Clair Hoke, Jr., Bethlehem, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 10 days.

(21) Appl. No.: 10/166,852

(22) Filed: Jun. 11, 2002

(51) Int. Cl.[7] .............................. F23C 5/08; F23C 7/00; F23M 3/04
(52) U.S. Cl. .................... 431/181; 431/10; 431/187
(58) Field of Search .................... 431/8, 10, 181, 431/187; 239/416.5, 424, 424.5, 426

(56) References Cited

U.S. PATENT DOCUMENTS

| | | | | |
|---|---|---|---|---|
| 3,547,568 A | * | 12/1970 | Shisler | 431/158 |
| 5,199,866 A | * | 4/1993 | Joshi et al. | 431/353 |
| 5,346,390 A | * | 9/1994 | Slavejkov et al. | 431/8 |
| 5,500,030 A | * | 3/1996 | Joshi et al. | 65/346 |
| 5,575,637 A | | 11/1996 | Slavejkov et al. | 431/8 |
| 5,611,682 A | | 3/1997 | Slavejkov et al. | 431/8 |

* cited by examiner

Primary Examiner—Henry Bennett
Assistant Examiner—Alfred Basichas

(57) ABSTRACT

An oxy-fuel burner is set forth for providing combustion energy to a glass furnace via the mixing and combustion of a fuel stream and an oxidizer stream. The burner is divided into at least two sections, a substantially vertical section beginning at the bottom or feed end of the burner and a generally shorter, substantially horizontal section terminating at the opposite or discharge end of the burner. In a key embodiment, the vertical section of the burner protrudes into the furnace atmosphere through the underside of an air port, while the horizontal section is pointed toward the interior of the furnace. Depending on the number of burners installed, this allows from partial to full conversion of an air fuel furnace to an oxy-fuel furnace. Also, in a key embodiment, the burner includes an oxidant staging means to introduce oxidizer through a staging conduit running beneath and collateral with the outer conduit.

4 Claims, 1 Drawing Sheet

SELF-COOLING OXY-FUEL THROUGH-PORT BURNER FOR PROTRUDING INTO GLASS FURNACE ATMOSPHERE

BACKGROUND OF THE INVENTION

Oxy-fuel burners that are able to capture the advantages of being able to protrude into the glass furnace atmosphere without succumbing to the extremely hot and corrosive gases that make up this atmosphere are known in the art. One protrusion geometry for these burners is through the sidewall of the furnace and into the furnace atmosphere in a substantially horizontal direction (the Sidewall Geometry). A second geometry is where the burner protrudes upwardly into the furnace atmosphere through the underside of an air port, also called a port neck (the Port Geometry). A third geometry, more common to steel furnaces, is where the burner protrudes into the furnace atmosphere through the roof of the furnace.

The oxy-fuel burners associated with the Port Geometry typically have a periscope-like design where the discharge end is curved or bent in a substantially horizontal direction pointing toward the interior of the furnace. Port Geometry oxy-fuel burners are useful during maintenance of an otherwise air fuel furnace. In particular, Port Geometry oxy-fuel burners enable shutting down the air system and associated heat recovery system (e.g. regenerators or recuperators) for maintenance while still keeping the furnace operable.

A problem with conventional protruding oxy-fuel burners is they require water cooling in order to survive the furnace atmosphere's extreme heat. The cooling water flows through a "jacket" that surrounds the burner nozzle. It is known that the water jacket absorbs a significant amount of thermal energy that would otherwise be used to melt the glass. Hence, users of this type of protruding oxy-fuel burner face an unavoidable loss in melting efficiency.

A more state-of-the-art self-cooling system is taught in U.S. Pat. Nos. 5,575,637 and 5,611,682 by Slavejkov, assigned to Air Products and Chemicals, Inc. In the self cooling system, the outer wall of the outer conduit comprises a refractory material-comprising, heat shielding, burner block such that the burner block enables the oxygen gas in the annulus space of the outside conduit to sufficiently cool the burner without the need for water cooling. However, this system incorporates a straight, rather than a periscope-type, fuel conduit. Moreover, the fuel nozzle in said system is recessed in the burner block and is often mounted outside the furnace so that a buffer exists between the furnace atmosphere and the metal parts. While such features are desirable with the Sidewall Geometry, they are not compatible with the Port Geometry.

In the past, the self cooling system has been considered mutually exclusive with a Port Geometry since it was generally assumed that the increased exposure of the burner block surface area coupled with the requisite extended penetration of burner metal into the block would lead to unacceptably high burner metal temperatures, eventually leading to burner failure.

The present invention has unexpectedly found, however, that if the Port Geometry is utilized and the proper balance is maintained between the exposed surface area of the heat shielding block and the flow rate of oxygen through the burner, sufficient cooling of burner metal is achieved to safely and reliably operate the burner in a glass furnace environment.

BRIEF SUMMARY OF THE INVENTION

The present invention is a through-port oxy-fuel burner for providing combustion energy to a glass furnace via the mixing and combustion of a fuel stream and an oxidizer stream. The burner is divided into at least two sections, a substantially vertical section beginning at the bottom or feed end of the burner and a generally shorter, substantially horizontal section terminating at the opposite or discharge end of the burner.

In a key embodiment, the vertical section of the burner protrudes into the furnace atmosphere through the underside of one of the furnace's air ports, while the horizontal section is pointed toward the interior of the furnace. Depending on the number of burners installed, this allows from partial to full conversion of an air fuel furnace to an oxy-fuel furnace.

Also in a key embodiment, the burner includes an oxidant staging means to introduce oxidizer through a staging conduit running beneath and collateral with said outer conduit.

DETAILED DESCRIPTION OF THE INVENTION

Figure 1:
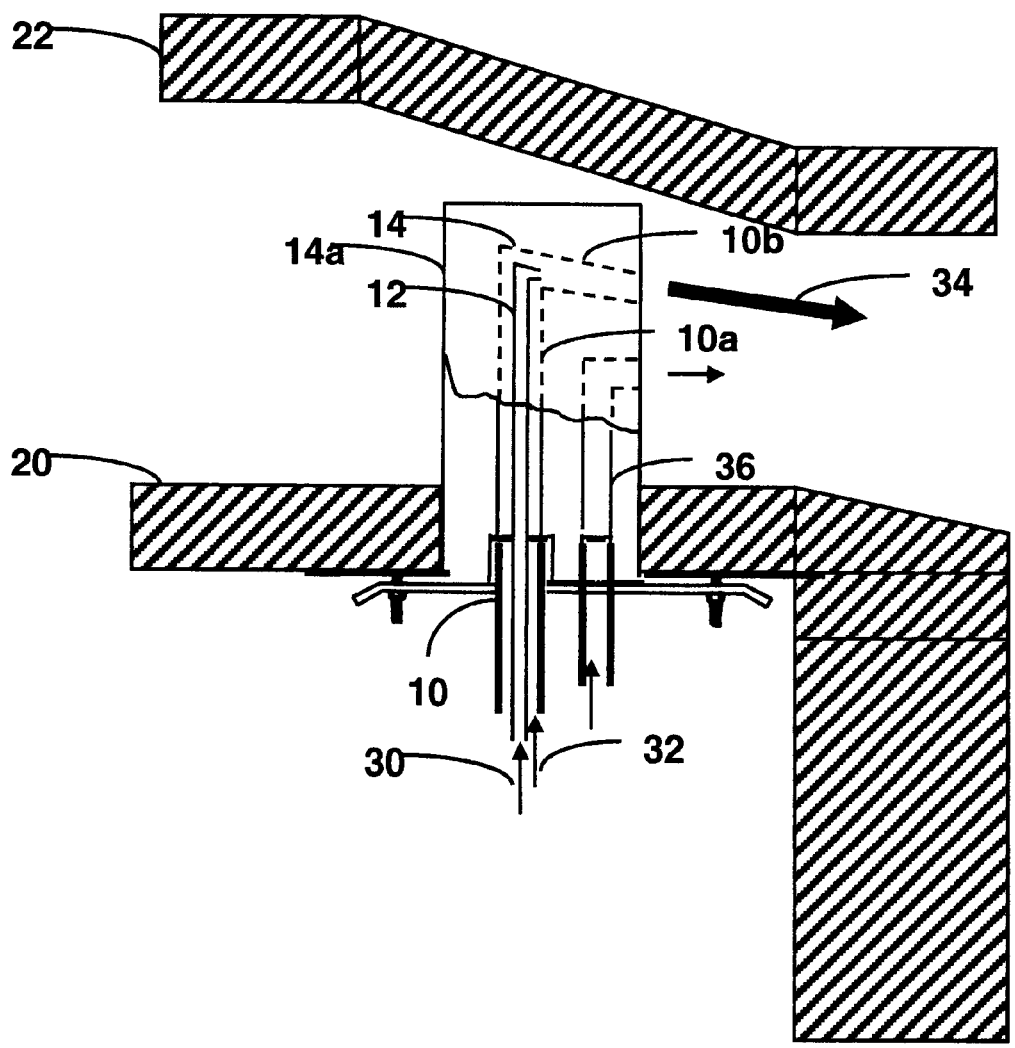
FIG. 1 is a schematic drawing of one embodiment of the present invention.

The through-port oxy-fuel burner of the present invention is best illustrated with respect to FIG. 1's embodiment thereof where the vertical section of the burner penetrates into the furnace atmosphere through the underside of one of the furnace's air ports, while the horizontal section is pointed toward the interior of the furnace. FIG. 1 depicts a glass furnace air port, and in particular a cut-away view of the air port showing it's underside [20] and topside [22] where the burner [10] penetrates into the furnace atmosphere through the underside [20] of the air port.

As shown in FIG. 1, burner [10] comprises concentric conduits, and in particular an inner conduit [12] containing the fuel stream surrounded by an outer conduit [14] containing the oxidizer stream.

The fuel stream [30] (typically natural gas or oil) and oxidizer stream [32] are introduced at the bottom, or feed end, of the burner, and are discharged [stream 34] at the opposite, or discharge end, of the burner. The cross sections of the inner and outer conduits can be of any shape. The outer wall [14a] of the burner [10] comprises a high-temperature, heat shielding material such as a refractory burner block.

The burner [10] is divided into at least two sections, a substantially vertical section [10a] beginning at the feed end and a substantially horizontal section [10b] terminating at the discharge end. In FIG. 1's embodiment, the vertical section penetrates into the furnace atmosphere through the underside [20] of the air port, while the horizontal section is pointed toward the interior of the furnace.

Typically, the vertical section is within 45 degrees of vertical, while the horizontal section is within 45 degrees of horizontal. Also typically, the vertical section is at least twice the length of the horizontal section.

FIG. 1's embodiment of the oxy-fuel burner of the present invention includes a staging means to introduce oxidizer through a staging conduit [36] running beneath and collateral with said outer conduit [14]. As taught in the '682 Slavejkov patent, the staging means facilitates the production of highly desirable flame characteristics, and in particular a longer, more luminous fuel-rich flame with radiant heat transfer directed preferentially downward toward the glass charge.

The skilled practitioner will appreciate that where the fuel is oil, another possible embodiment of the burner of the present invention is where there are a plurality of conduits surrounding the fuel oil conduit, where at least one of the surrounding conduits contains the oxidizer stream and at least one contains an atomizer stream.

The skilled practitioner will appreciate there are many other embodiments of the present invention within the scope of the following claims.

What is claimed is:

1. An oxy-fuel burner for providing combustion energy to a glass furnace via mixing and combustion of a fuel stream and an oxidizer stream wherein:

(a) said burner comprises concentric conduits, and in particular an inner conduit containing the fuel stream surrounded by an outer conduit containing the oxidizer stream;

(b) the fuel and oxidizer are introduced into the bottom, or feed end, of the burner and are discharged at the opposite, or discharge end, of the burner;

(c) the outer wall of the burner is a high temperature, heat shielding material that enables the oxygen gas in the annular space of the outside conduit to sufficiently cool the burner without the need for water cooling; and (d) the burner is divided into at least two sections, a substantially vertical section beginning at the bottom end and a substantially horizontal section terminating at the discharge end.

2. The burner of claim 1 wherein the vertical section of the burner penetrates into the furnace atmosphere through the underside of an air port in an air fuel furnace and wherein the horizontal section of the burner is pointed toward the interior of the furnace.

3. The burner of claim 1 further comprising an oxidant staging means to introduce oxidizer through a staging conduit running beneath and collateral with said outer conduit.

4. The burner of claim 1 wherein the vertical section is within 45 degrees of vertical, while the horizontal section is within 45 degrees of horizontal.

* * * * *